United States Patent
Greenberg et al.

[15] 3,682,580
[45] Aug. 8, 1972

[54] MANUALLY OPERABLE APPARATUS FOR MOLDING PLASTIC COPINGS AND SIMILAR ARTICLES

[72] Inventors: Samuel Greenberg, Montgomeryville; Abe Jacobs, Philadelphia, both of Pa.

[73] Assignee: Samuel Greenberg, Montgomery County, Pa.

[22] Filed: May 28, 1970

[21] Appl. No.: 41,350

[52] U.S. Cl. ............... 425/193, 264/89, 425/157, 425/169, 425/388
[51] Int. Cl. .................................. B29c 17/04
[58] Field of Search....... 18/5.7, 19 D, 19 F, DIG. 60; 32/2; 264/88, 89, 92, 93

[56] References Cited

UNITED STATES PATENTS

| | | |
|---|---|---|
| 3,528,132 | 9/1970 | Greenberg et al..........18/19 F |
| 2,217,390 | 10/1940 | Taub .............................18/5.7 |
| 2,761,175 | 9/1956 | Myerson...................18/5.7 X |
| 3,600,752 | 8/1971 | Kopp.........................18/19 H |

Primary Examiner—J. Spencer Overholser
Assistant Examiner—Lucius R. Frye
Attorney—Max R. Millman

[57] ABSTRACT

A manually operable apparatus for forming plastic dental copings, models, splints, guards, trays, and the like in which a plastic disk or sheet holder is resiliently mounted over a receptacle removably containing male dies, a heater is rotatably mounted to move to an operative position directly over the holder until the plastic is softened and then to an inoperative position out of the way, a pressure dome is rotatably mounted to move from an inoperative position out of the way to an operative position directly over the plastic disk holder and a rotatable means is provided to close the dome down on the holder and against the receptacle until the plastic is draped and formed over the male dies.

12 Claims, 8 Drawing Figures

INVENTORS.
SAMUEL GREENBERG
ABE JACOBS
BY
Max R. Millman
ATTORNEYS.

INVENTORS.
SAMUEL GREENBERG
ABE JACOBS
BY
Max R. Millman
ATTORNEYS.

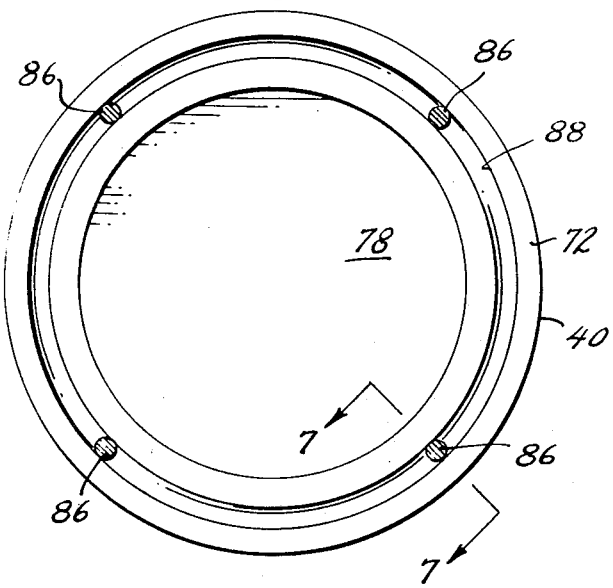
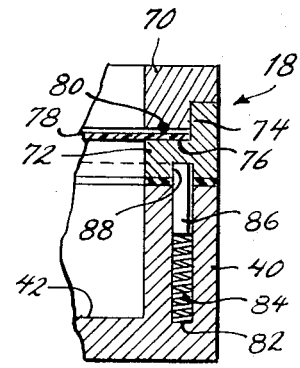
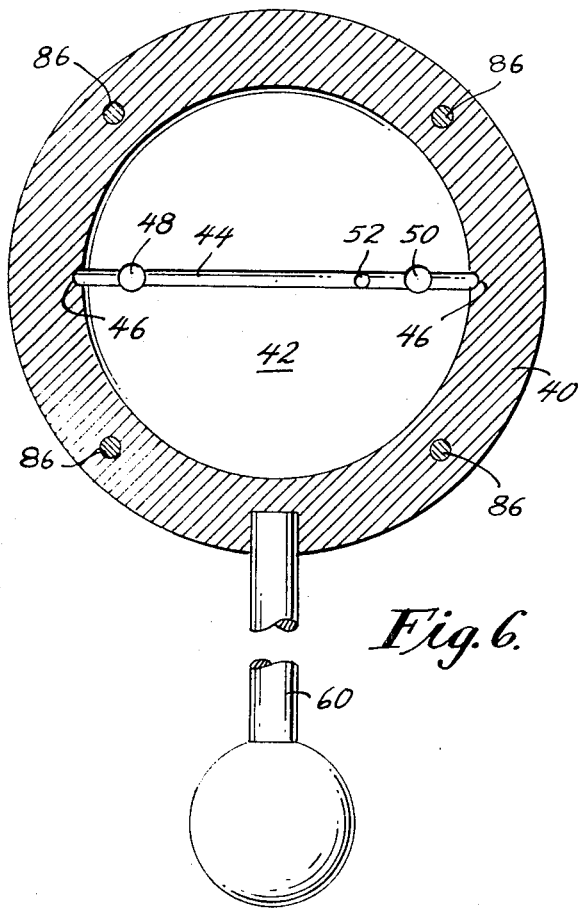
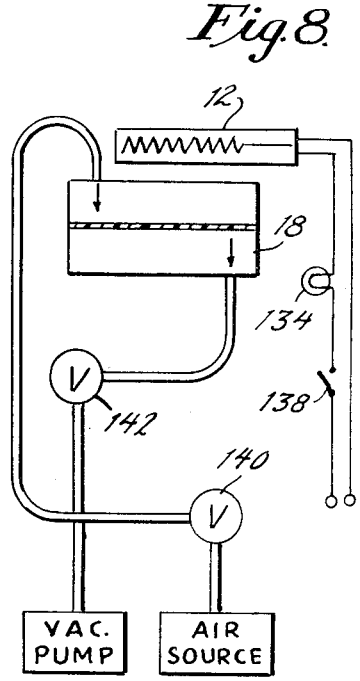
INVENTORS.
SAMUEL GREENBERG
ABE JACOBS
BY
Max R. Millman
ATTORNEYS

MANUALLY OPERABLE APPARATUS FOR MOLDING PLASTIC COPINGS AND SIMILAR ARTICLES

This invention relates to the molding or forming of dental members such as waxing copings, transfer copings, full models of the teeth or mouth, splints, teeth guards, medicament applicators and the like of plastic, the primary object of which is to accomplish the molding in a dental laboratory or by the dentist himself economically, accurately and efficiently. To the extent that the apparatus of the invention is of less complex and costly construction, it constitutes an improvement over the apparatus of application Ser. No. 756,750 filed Sept. 3, 1968 now U.S. Pat. No. 3,528,132 owned by the same assignee, Samuel Greenberg.

Another object of the invention is to provide apparatus for molding plastic dental members of the character described which involves simple sequential manual manipulations to carry out the entire operation which is capable of being performed with a minimum of skills.

Another object of the invention is to provide apparatus for molding plastic dental members which, although manually operable, is nevertheless capable of producing plastic copings, models and the like members which closely and accurately conform to the shape of the male members over which the plastic is draped during the operation of the apparatus, without causing any warping in the formed member, so that the same can be readily refitted after trimming upon the male members.

Another object of the invention is to provide a manually operable apparatus for molding plastic dental copings, models, and the like which utilizes the application of pressure to a softened plastic sheet over a male die or mold via a dome wherein a resilient means is employed to react upon the dome when it is closed upon the sheet holder and over the male member, the resilient means acting in cooperation with the applied pressure to cause accurate draping over and conformity of the plastic sheet to the male mold.

These and other objects of the invention will become more apparent as the following description proceeds in conjunction with the accompanying drawings, wherein:

FIG. 5 is an enlarged sectional view taken on the line 5—5 of FIG. 4;

FIG. 6 is a sectional view taken on the line 6—6 of FIG. 4;

FIG. 7 is a sectional view taken on the line 7—7 of FIG. 5; and

FIG. 8 is a schematic view of the pressure, vacuum and heater circuit.

Specific reference is now made to the drawings in which similar reference characters are used for corresponding elements throughout.

Figure 1:
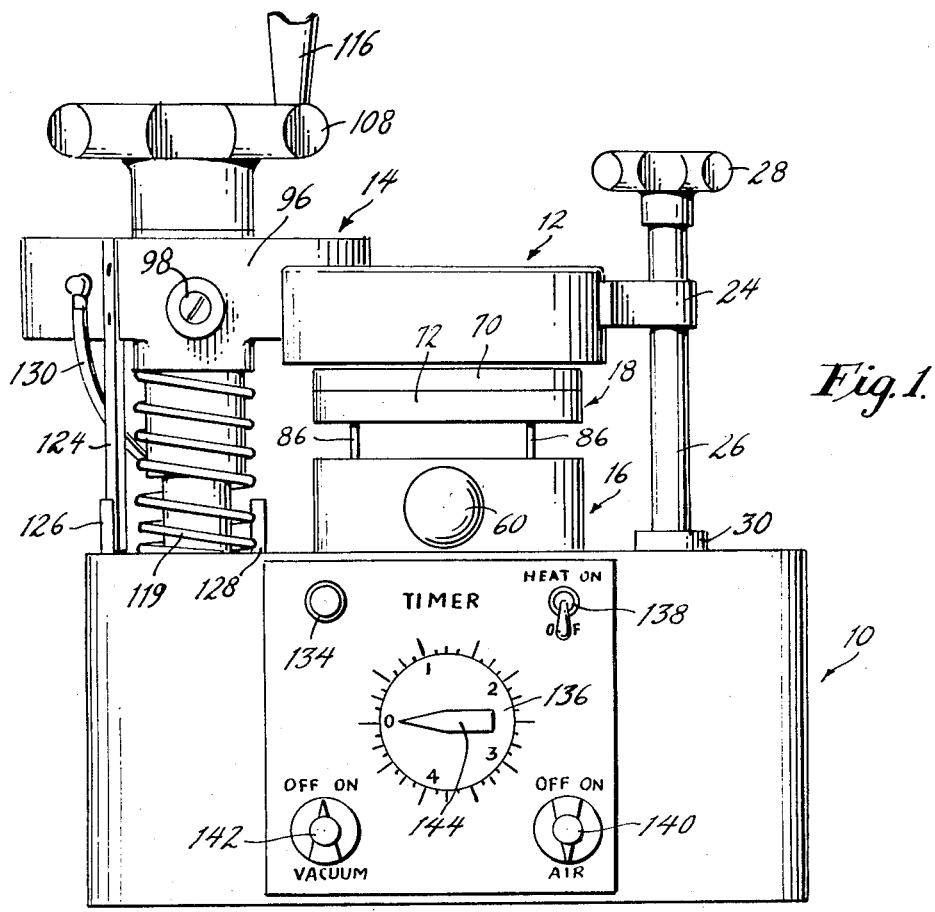
FIG. 1 is a front elevational view of the apparatus of the invention shown with the heater in an operative position.

The apparatus comprises essentially a hollow housing 10, a heater 12, a pressure dome unit 14, a receptacle 16 for retaining the male mold or die and a holder 18 for a plastic disk which will be draped and formed over the male mold or die by the application of pressure thereover through the dome as will appear hereinafter.

The housing is formed of a peripheral wall 20 and an upper wall 22. The heater 12, preferably disk-shaped and equipped with an electric coil heating element at its undersurface, is secured as by a gusset 24 to a vertical post 26 adjacent its upper end, to which upper end is affixed a hand knob 28. The post extends through the upper wall 22 of the housing and is rotatably journaled thereto by a suitable bearing and collar 30. The end of the post which extends through the bearing is provided with a second collar 31 having two lateral pins 32 and 34, about 120° apart, which alternately engage a further pin 36 depending from a reinforcing rib 38 in the housing to limit and determine the operative and inoperative positions of the heater as will appear hereinafter.

The receptacle 16 is preferably cup-shaped and includes a peripheral wall 40 and a base 42, there being a continuous groove which is provided on the inner surface of the base and the peripheral wall which includes a portion 44 extending diametrically of the base 42 and vertical portions 46 at the ends of the diametrical portion extending up the peripheral wall 40 to the top thereof. Opening through the base 42 at the groove 44 are spaced holes 48, 50 and 52. Upstanding from the upper wall 22 of the housing are pins 54 and 56 and a resilient gasket or O-ring 57 therearound. Adjacent one of the pins 56, the upper wall of the housing is provided with a further opening 58. The receptacle is provided with an appropriate handle 60.

Removably positioned within the receptacle is a cup-shaped member or cartridge holder 62 which is smaller than the outer receptacle and rests on the bottom wall thereof. The member 62 is provided with a dental molding compound 64 upon whose top layer may be mounted resilient foam or sponge material 66.

A male member or die 68 is inserted into the molding compound through the sponge layer with its crown portion exposed and extending beyond the upper edge of the inner cup or cartridge holder 62 and the receptacle 40. Several such male die members can be retained in the molding compound. While the drawings illustrate the making of waxing or transfer copings wherein the dentist has taken an impression of the tooth and made the male member 68 to conform thereto by means of conventional materials such as metal, stone, epoxy, etc., it will be understood that other male dental members may be retained in the cartridge holder 62 to make full models of teeth, splints, guards, medicament applicators and the like.

As seen in FIGS. 5 and 7, the plastic disk holder 18 comprises essentially two rings 70 and 72 which in vertical cross section consist of mating steps as shown at 74 providing an annular ledge 76 in the lower ring for the mounting of a plastic disk 78 and which is held tightly in place when the rings mate, there being a resilient or rubber O-ring 80 in the upper ring to assist in the holding action.

Circumferentially spaced vertical bores 82 opening through the upper edge of the peripheral wall 40 of the receptacle 16 are each provided with a spring 84 and a pin 86 thereabove urging the pin upwardly through the upper edge of the receptacle and into recesses 88 opening through the lower edge of the lower ring 72 of the plastic disk holder.

Figure 3:
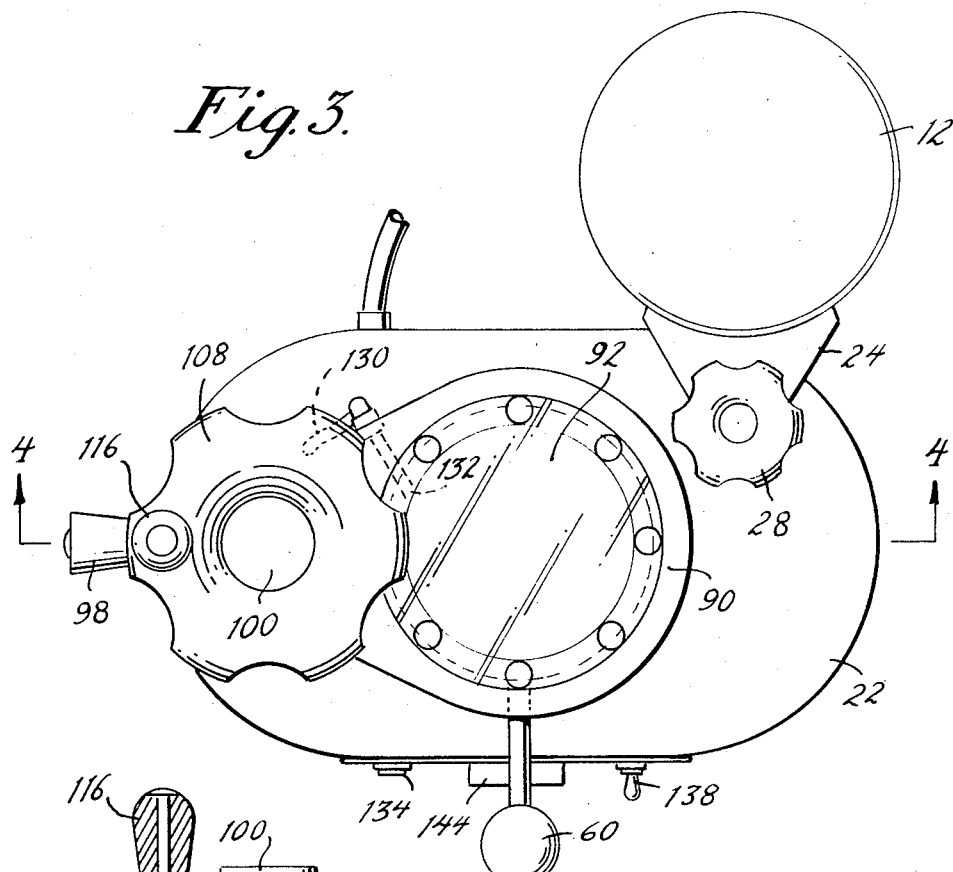
FIG. 3 is a top plan view taken from the line 3—3 of FIG. 2.
Figure 4:
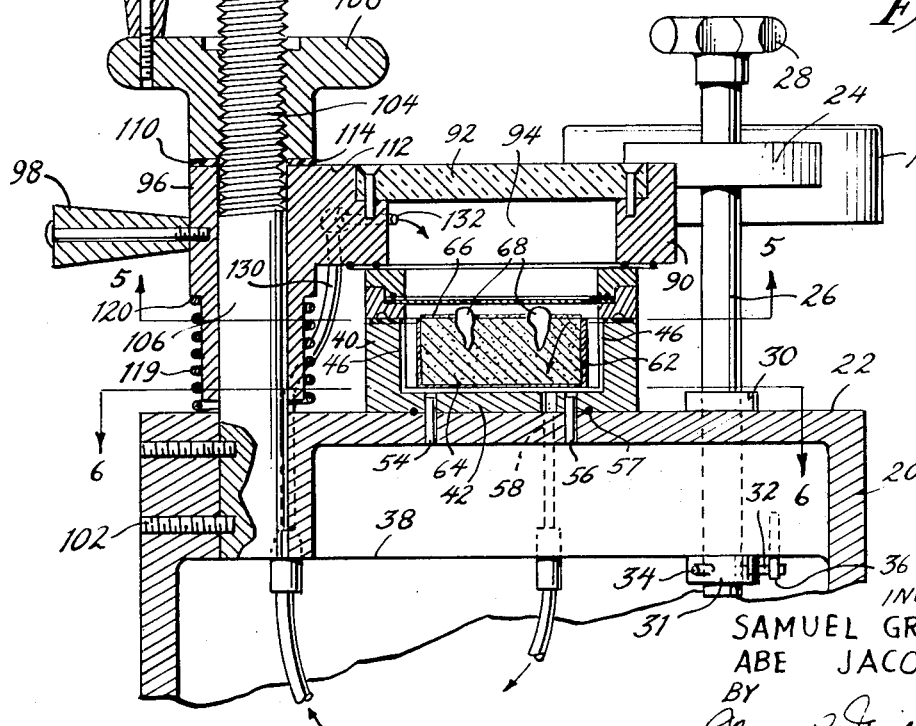
FIG. 4 is a sectional view taken on the line 4—4 of FIG. 3.

As seen in FIGS. 3 and 4, the pressure dome unit 14 comprises a manifold in the form of a disk-like plate or ring member 90 in the top of which is mounted a viewing window 92 and below which is a bottom opening cavity 94. One end of the ring member 90 of the dome is formed into a collar portion 96 having a laterally extending handle 98 secured thereto. The collar is rotatable upon a vertical post 100 which is fixedly secured by appropriate means 102 to the housing 10 and extends upwardly through the upper wall 22 thereof at a position diametrically opposite the heater post 26. The upper portion of the post 100 contains outer threads 104 whereas its lower portion is smooth as at 106. Movably mounted on the upper end of the post 100 is an internally threaded handgrip member 108 having a lower shoulder 110 which bears on the upper surface 112 of the collar portion 96 of the dome, the lower shoulder 110 carrying an appropriate gasket 114. The handgrip member 108 may also be equipped with an upstanding handle 116 to assist in rotating the grip on the post. The collar portion 96 of the dome includes a reduced portion 118 forming an annular shoulder 120. A coil spring 119 is wound about the reduced portion 118 and is interposed between the upper wall 22 of the housing and the shoulder 120, the spring acting to urge the dome upwardly against the handgrip 108. A bar 124 depends from the collar portion 96 and is adapted to alternately engage a pair of stops 126 and 128 upstanding about 120° apart from the upper wall 22 of the housing to limit the operative and inoperative positions of the dome.

A flexible tube for compressed air 130 extends into the collar portion 96 of the dome and opens into the cavity 94 thereof as at 132.

Mounted on the peripheral wall 20 of the housing is a glow lamp 134, a timer 136, an on-off heater switch 138, an on-off compressed air valve 140 and an on-off vacuum valve 142. Couplings (not shown) are carried by the housing for attaching hoses to a source of vacuum and a source of air under pressure.

In use, initially the heater 12 is rotated by its handle 28 to an inoperative position away from the upper wall 22 of the housing at which point the pin 32 at the inner end of the post 26 carrying the heater engages one of the stops 36. The dome 14 is also rotated by means of its lateral handle 98 to an inoperative position away from the upper wall of the housing at which point the bar 124 engages the stop 126. The receptacle 16 with the inner cup 62 and the dies 68 retained therein is then positioned on the upper wall of the housing and turned via the handle 60 until the locating pins 54 and 56 enter the holes 48 and 50 in the bottom wall of the receptacle at which point holes 52 and 58 register. The plastic disk holder with a plastic disk mounted therein is then mounted on the receptacle by interfitting the spring-urged pins 86 into the recesses 88 opening through the bottom of the holder.

Figure 2:
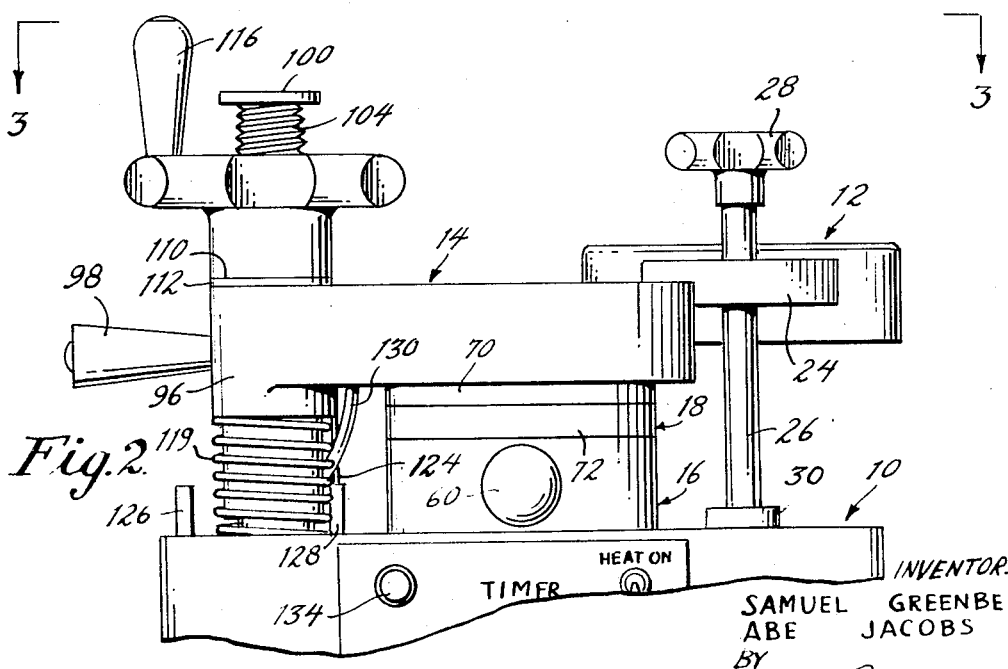
FIG. 2 is a fragmentary enlarged front elevational view showing the heater in an inoperative position and the pressure dome in an operative position.

The heater is then turned to its operative position above the plastic disk holder, as shown in FIG. 1, at which point the pin 32 engages the other stop 34. With the timer hand 144 set a predetermined time value on the dial, say 1 or 2 minutes depending upon the kind of plastic used and the thickness of the disk, the toggle switch 138 is thrown to the on position at which time the glow lamp lights up indicating that the machine is in operation. When the timer hand returns to the zero position, a buzzer (in the timer) sounds, at which time the operator turns the heater to its inoperative position and the dome to its operative position above the plastic disk holder as shown in FIGS. 2-4, at which point the bar 124 engages the second stop 128.

The operator then lowers the dome by rotating the handle 108 in a clockwise direction whereupon the ring-like portion 90 of the dome engages the plastic disk holder and presses it down against action of the spring-urged pins 86 and the coil spring 96 as seen in FIGS. 3 and 4. The vacuum and pressure valves are then turned to their on positions and the timer reset for the length of exposure to pressure and vacuum required depending again on the kind of plastic disk used and its thickness. In this stage, air is drawn out of the bottom of the receptacle via the hole 52 therein and the hole 58 in the housing wall while air under pressure is fed into the cavity 94 of the dome via the tube 30 and opening 32 above the softened plastic disk, causing the plastic to drape over and around the male die members with substantially uniform positive pressure acting against all sides of the plastic draped on the male die members. When the timer hand again returns to the zero position, the buzzer sounds again at which point the operator unscrews the hand knob 108 and the spring 119 acts on the dome to raise it, at which point the plastic holder with the molded plastic therein is also raised above the receptacle 16 by the springs 84 and the molded plastic removed and ultimately trimmed. It should be understood that the delivery of compressed air in the dome relative to the vacuum simultaneously applied to the bottom of the receptacle creates a greater positive pressure in the dome and also causes air circulation around the softened plastic disk draped on the male dies. In practice, it was found that the air pressure in the dome should be in the order of magnitude of 70 psi and the vacuum applied to the receptacle in the order of magnitude of 15'' or more. Air pressure alone may, if desired, be employed in the order of magnitude of 70 psi, in which case there is no circulation of air in the enclosed space around the softened disk.

By providing a diametrical groove 44 in the bottom of the receptacle upon which the die-retaining cup 62 rests, a path for air withdrawn by the vacuum is assured. Since the die-retaining cup 62 is generally made of plastic and can flex, the groove portion 46 vertically along the peripheral wall of the receptacle also assures a path for air withdrawn by vacuum should the cup expand by the applied pressure and contact the peripheral wall of the receptacle.

A wide variety of thermoplastic plastics may be employed depending upon whether one desires to make a waxing coping, a transfer coping, a temporary splint, a base plate, an impression tray, a mouth guard or a medicament applicator and may include polyethylene, polystyrene, Alathon (an ethylene-vinylacetate copolymer made by DuPont), Surlyn (an ionomer resin made by DuPont) and the like.

While a preferred embodiment of the invention has here been shown and described, it is understood that skilled artisans may make minor variations without departing from the spirit of the invention.

What is claimed is:

1. Apparatus for forming plastic dental copings, models, splints, guards, trays and the like comprising a support, a receptacle to removably retain male dies, a holder to removably retain a plastic sheet, resilient means mounting said holder above said receptacle, a heater, means mounting said heater on said support for movement from an inoperative position to an operative position directly above said holder to soften the plastic sheet, a dome, means mounting said dome for movement from an inoperative position to an operative position directly over said holder when said heater has been moved into its inoperative position including a post secured to said support, said dome having a collar rotatably mounted on said post, rotatable means bearing on said collar to lower said dome onto said holder, compress said resilient means and cause the plastic sheet to engage the male dies when said dome is in its operative position, and means to apply air pressure through said dome over said plastic sheet to cause the plastic sheet to drape over the male dies and conform to the shape thereof.

2. The apparatus of claim 1 and a spring between said support and said dome collar urging said dome upwardly away from said plastic disk holder.

3. The apparatus of claim 1 wherein said rotatable dome lowering means includes an externally threaded portion at the upper end of said post and an internally threaded member engaging said externally threaded portion bearing on said dome collar.

4. The apparatus of claim 3 and a spring between said support and said dome collar urging said dome upwardly away from said plastic disk holder.

5. The apparatus of claim 4 and stop means interengageable between said support and said collar to limit the operative and inoperative positions of said dome.

6. The apparatus of claim 1 and a means removably mounting said receptacle on said support including at least one hole in the base of said receptacle and at least one locating pin upstanding from said support and receivable in said hole.

7. The apparatus of claim 1 and means to apply vacuum to said receptacle simultaneously with the application of air pressure through said dome.

8. The apparatus of claim 7, a cup therein with means to removably retain the male dies, and a groove across the bottom of said receptacle beneath said cup continuing at its ends up the receptacle side wall and spaced from said cup providing clearance between the cup and receptacle for circulation of air when vacuum is applied to said receptacle.

9. In an apparatus for forming plastic dental copings, models, splints, guards, trays, and the like including a support, a receptacle mounted thereon for removably retaining male dies, a plastic sheet holder mounted thereover for movement towards and away from the receptacle, a heater movable to an operative position directly over the holder to soften the sheet and then to one side of the holder in an inoperative position; a dome, means mounting said dome on said support for movement into an operative position directly over the plastic holder and to an inoperative position to one side of the plastic holder including a post secured to said support, said dome having a collar rotatably mounted on said post, rotatable means bearing on said collar to lower said dome to contact said plastic holder and hold the same against the receptacle and the plastic sheet against the male dies including a post mounted on said support to one side of said receptacle and plastic sheet holder and a collar carried by said dome and rotatable on said post.

10. The apparatus of claim 9 and a spring interposed between said collar and said support urging said dome upwardly away from said plastic sheet holder.

11. The apparatus of claim 9 and stops cooperative between said collar and said support to limit the movement of said dome at the operative and inoperative positions.

12. The apparatus of claim 9 wherein said rotatable means to lower said dome includes an upper externally threaded portion on said post, an internally threaded member engaging said externally threaded portion and bearing on said collar and a spring interposed between said collar and said support urging said dome upwardly away from said plastic sheet holder.

* * * * *